Figure 1:
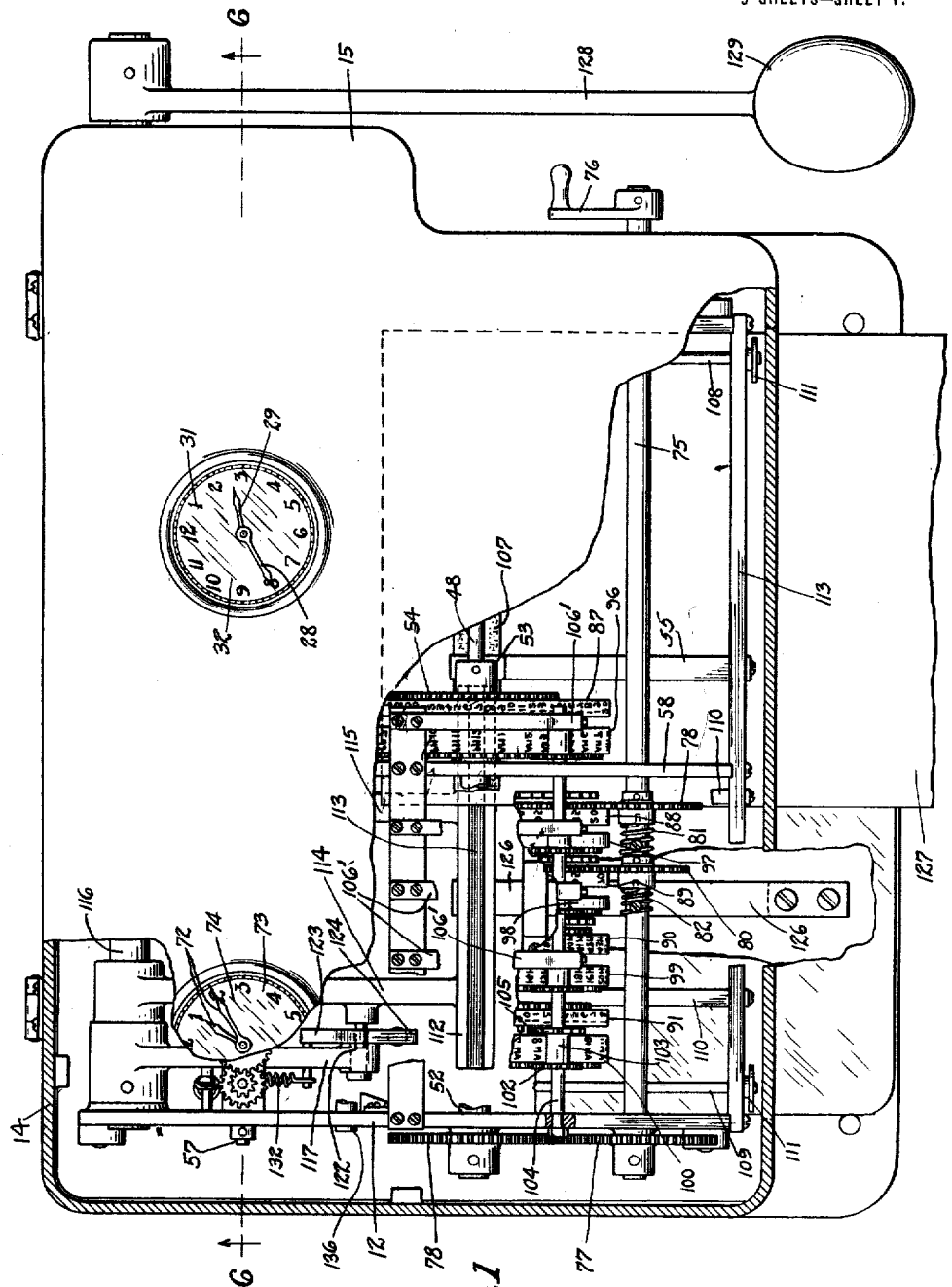

L. G. ZESBAUGH.
ELAPSED TIME CALCULATING DEVICE.
APPLICATION FILED OCT. 31, 1913.

1,332,372.

Patented Mar. 2, 1920.
5 SHEETS—SHEET 1.

INVENTOR
Lawrence G. Zesbaugh
BY
HIS ATTORNEY

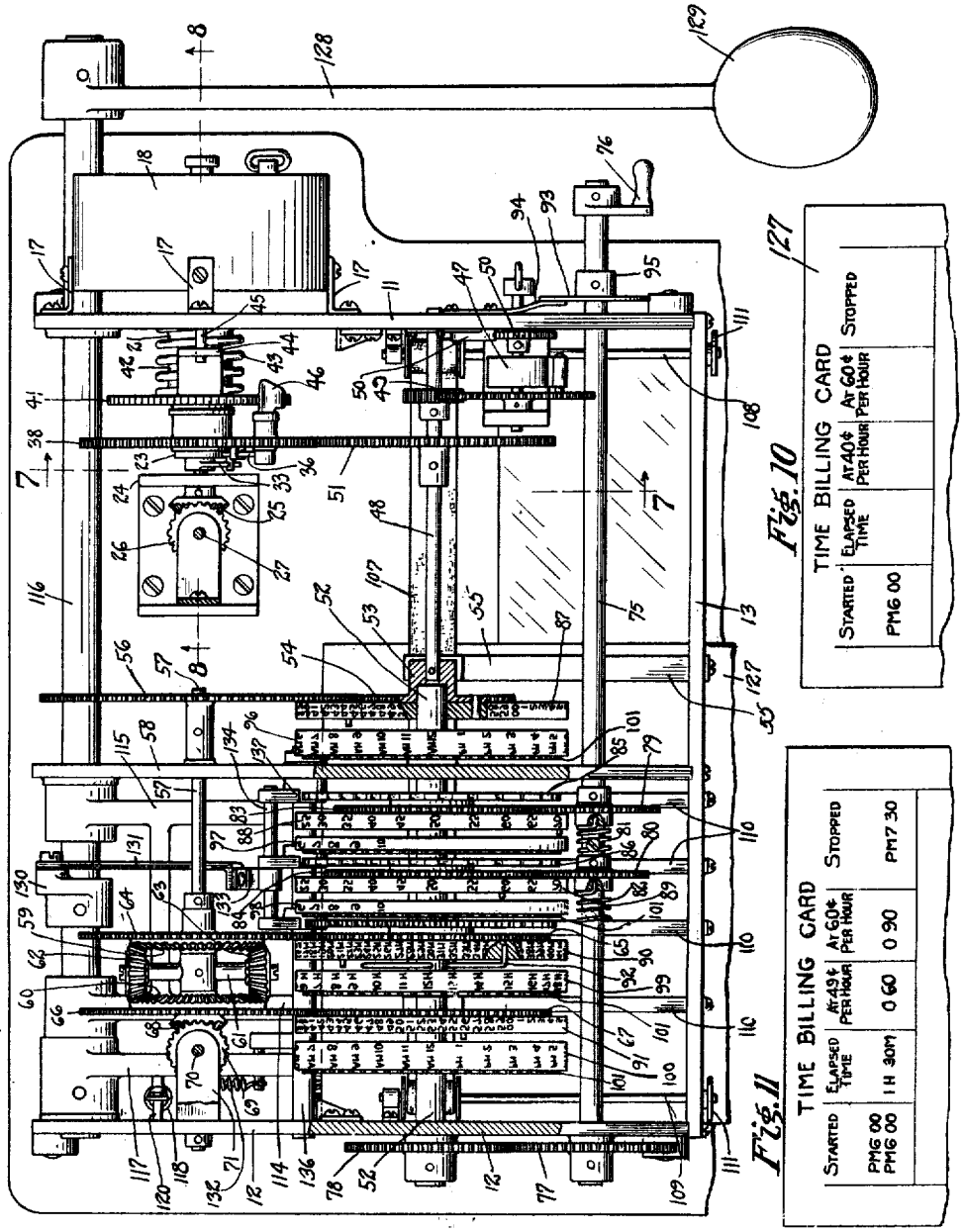

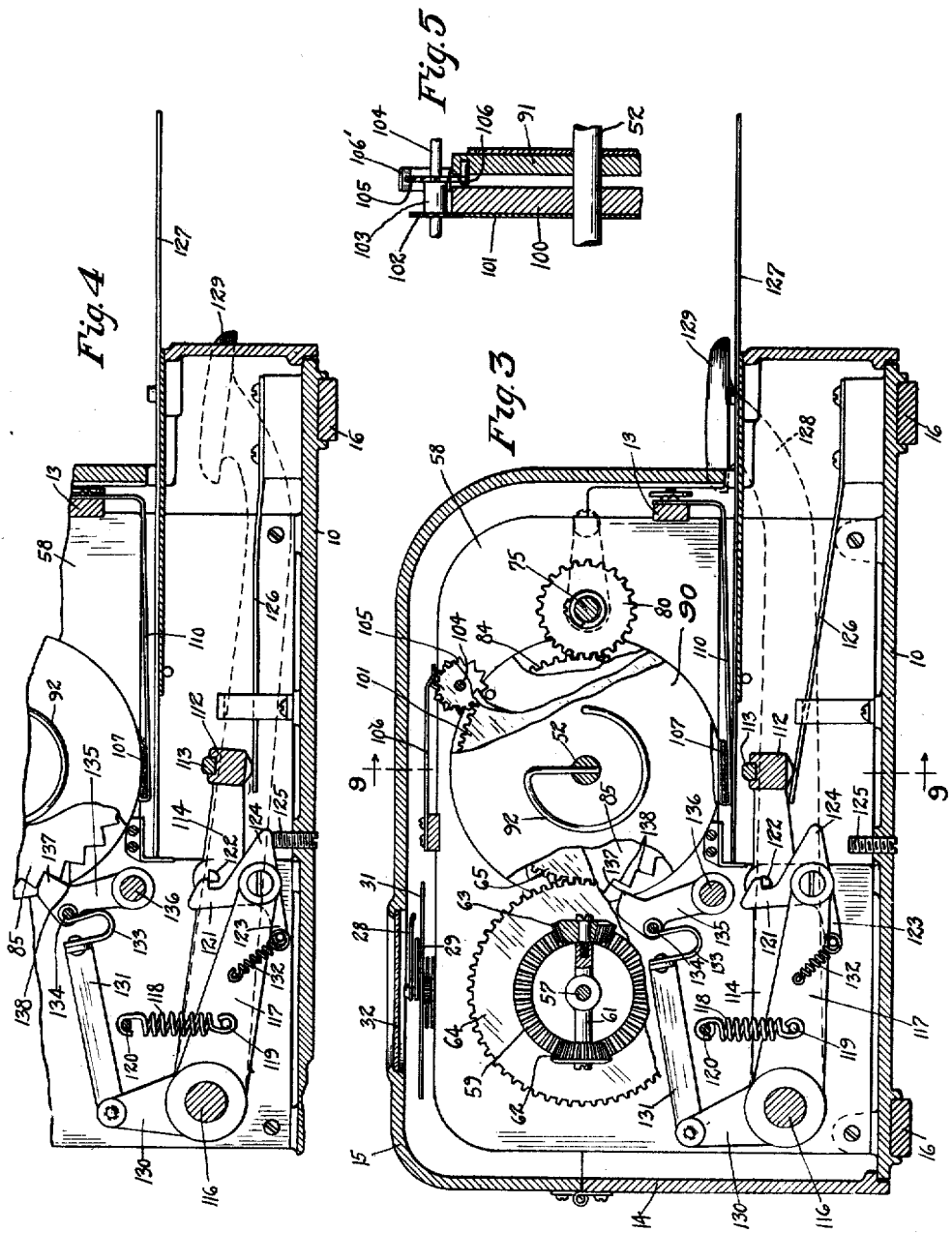

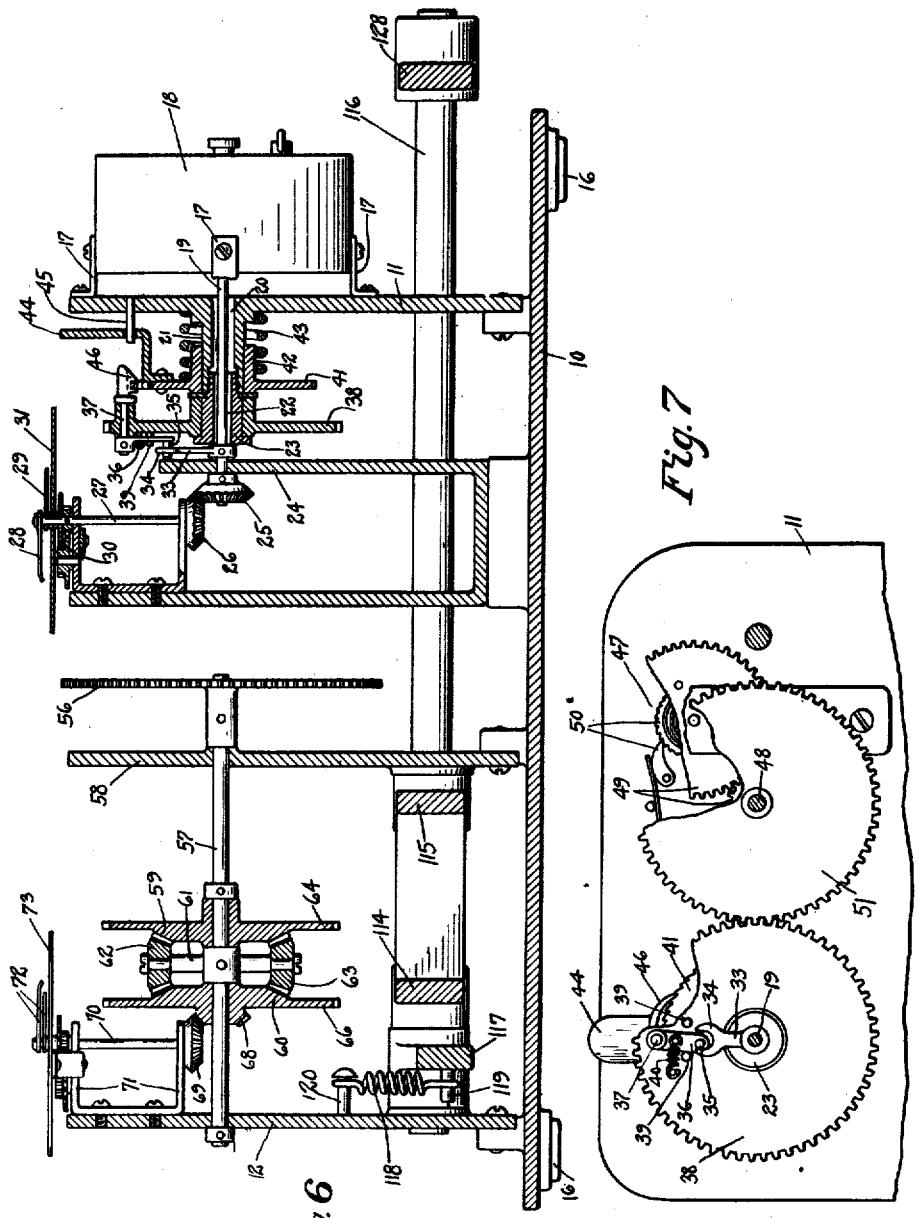

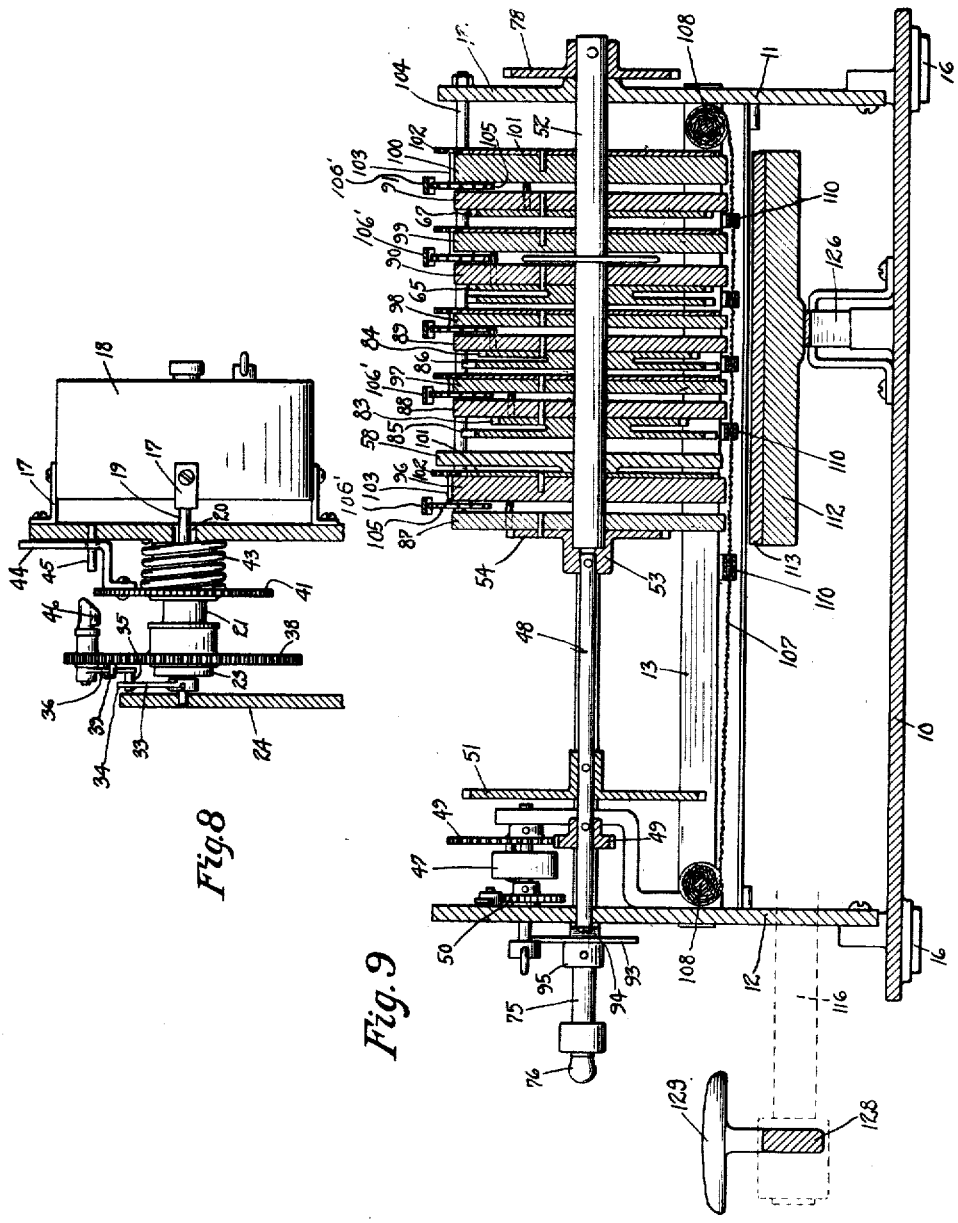

UNITED STATES PATENT OFFICE.

LAWRENCE G. ZESBAUGH, OF MINNEAPOLIS, MINNESOTA.

ELAPSED-TIME-CALCULATING DEVICE.

1,332,372.  Specification of Letters Patent.  Patented Mar. 2, 1920.

Application filed October 31, 1913. Serial No. 798,580.

*To all whom it may concern:*

Be it known that I, LAWRENCE G. ZESBAUGH, a citizen of the United States, residing at Minneapolis, in the county of Hennepin and State of Minnesota, have invented certain new and useful Improvements in Elapsed-Time-Calculating Devices, of which the following is a specification.

My invention relates to elapsed-time calculating devices and has for its object to provide a machine wherein a clock is provided which, in addition to indicating the true time, controls certain devices for properly setting printing rollers whereby two time periods may be indicated upon the card together with the elapsed time between such periods and the amount to be paid at various given rates per hour for the actual elapsed time.

The particular purpose to be served by my device is in connection with billiard or pool tables, bowling alleys, etc., in which a charge is made for the use of said tables based upon the length of time which the table or implement is used, the rate also varying in accordance with the number of players who use the same. My machine makes a record upon a card showing the time started. A pair of clock dials are provided, one of which at all times indicates the correct time. The other dial is connected with mechanism whereby, when it is set after a certain time has elapsed to indicate the starting time, printing rolls will thereby be brought into position to print upon the card the starting time, the stopping time, the elapsed time, and the amount to be paid for such elapsed time at the several rates charged. It thus appears that the user of such service is provided with a clear and definite record of the transaction about which there can be no dispute, which is a matter of very great advantage in this class of business where the records kept by the proprietor are often questioned and difficulty is experienced in making collections.

The full objects and advantages of my invention will appear in connection with the detailed description thereof and are particularly pointed out in the claims.

In the drawings, illustrating the application of my invention in one form—

Figure 1 is a top plan with some parts broken away. Fig. 2 is a view of a portion of the machine similar to Fig. 1 with the cover removed and all parts in position, some elements being shown in section. Fig. 3 is a transverse section of the machine. Fig. 4 is a view of a portion of the parts shown in Fig. 3 in a somewhat different position. Fig. 5 is a sectional detail. Fig. 6 is a longitudinal sectional elevation on line 6—6 of Fig. 1 with the top cover removed. Fig. 7 is a sectional elevation of a part of the machine taken on line 7—7 of Fig. 2. Fig 8 is a sectional view on line 8—8 of Fig. 2. Fig. 9 is a sectional view on line 9—9 of Fig. 3. Figs. 10 and 11 are diagram views of the time-billing cards and the first and second printing respectively.

A casing is provided which comprises a bottom 10, ends 11, 12, a front wall 13, rear wall 14 and cover 15 hinged to the rear wall 14. This casing member rests upon feet 16 directly upon a table or stand, or may be hung upon the wall so that said feet 16 engage the wall and the cover portion of the casing is turned outwardly. Secured to end wall 11 by means of clips or angle pieces 17 is a clock 18, which may be of any well-known construction, as best shown in Fig. 6. The post 19 of this clock extends through an aperture 20 in a tubular extension 21 formed on plate 11, and also through a bore or aperture 22 in a sleeve member 23 screwed into the tubular extension 21, the said post 19 extending beyond the end of sleeve member 23 and through and beyond a standard 24 in which said post 19 has a bearing. Upon the end of post 19 is a bevel gear 25 meshing with a bevel gear 26 on a shaft 27 carrying a minute-hand 28, and hour-hand 29 being operated by intermediate gearing 30 in a well-known way, said hands turning over a dial face 31 visible through a glass plate 32 in the top of casing cover 15. These hands are constantly driven by the clock and are regulated to indicate at all times the correct time. Fast on shaft or clock post 19 is an arm 33 provided with a yoked end 34, which embraces a pin 35 on an arm 36 carried by a rock shaft 37 journaled in a spur gear 38 which is freely rotatable upon sleeve 23. The arm 36 is capable of a limited swinging movement between pins 39 fast on spur gear 38, a spring 40 normally holding the arm 36 in engagement with one of said pins. A ratchet disk 41 has its hub 42 slidably mounted upon the tubular extension 21, being normally pressed outwardly into engagement with the hub of spur gear 38 by means of a coil spring 43. An arm 44 provided with an aperture through which extends a pin 45 fast in wall 11, serves the double purpose of holding the ratchet disk 41 from rotation upon extension 21, and of providing a lever-lock member for sliding the hub 42 and disk 41 inwardly by hand when it is desired to do so. The rock shaft 37 has thereon a pawl 46 which engages in the notches of ratchet disk 41, all as clearly shown in Figs. 2, 6 and 7. By this means an intermittent movement is given to spur gear 38 through the arm 33 and the clock post 19. It will be seen that as arm 33 moves forward the yoke end 34 thereof will engage pin 35 on arm 36, moving said arm against the force of spring 40 so as to rock the shaft 37 and lift pawl 46 from engagement with a ratchet tooth. The spring 40 will then immediately draw on the spur gear 38 and rotate the same, which rotation returns the pawl 46 into locking engagement with another ratchet tooth.

If the clock 18 were sufficiently strong this arrangement would be sufficient to drive the spur gear 38 and the parts connected therewith. In practice, however, it has been found desirable to employ a second set of clock work 47, or, rather, a spring motor which is geared to a shaft 48 by means of gear 49, a pawl and ratchet mechanism 50 holding the motor so as to cause the gearing to tend to turn shaft 48 always in one direction. Upon shaft 48 is a spur gear 51 meshing with spur gear 38 so that the drive of shaft 48 is controlled through the clock arm 33 and pawl 46 operated thereby by the time clock 18.

Mounted in the frame in alinement with shaft 48 is a shaft 52 journaled in end wall 12 and cross partition 58, the inner end of said shaft having a bearing in the hub 53 of a spur gear 54, said hub being supported by a standard 55, as clearly shown in Figs. 1 and 2. The spur gear 54 meshes with spur gear 56 on a shaft 57 journaled in end member 12 and a cross partition 58, as best shown in Figs. 2 and 6. Upon the shaft 57 is a differential comprising two floating bevel wheels 59 and 60 freely rotatable upon shaft 57, and a crossbar 61 fast on shaft 57, said crossbar having two diametrically opposite bevel wheels 62 and 63 meshing with the bevel gears 59 and 60. Bevel gear 59 carries a spur gear 64 meshing with a spur gear 65 on shaft 52. Bevel wheel 60 has a spur gear 66 which meshes with a spur gear 67 on shaft 52, and also has a bevel gear 68 which meshes with a bevel gear 69 on a shaft 70 journaled in bracket arms 71. The shaft 70 operates clock hands 72 over a clock face 73 visible through a transparent portion 74 of the casing cover 15.

A shaft 75 is journaled in end pieces 11 and 12 and is provided with a crank 76 for turning same. Secured to said shaft, outside of end piece 12, is a spur gear 77 which meshes with a spur gear 78 fast on shaft 52, as clearly shown in Figs. 1, 2 and 9. Mounted upon shaft 75 are a pair of spur gears 79 and 80, these gears being yieldingly held to rotate with shaft 75 by means of springs 81 and 82. Spur gear 79 meshes with a spur gear 83, and spur gear 80 meshes with a spur gear 84 rotatably mounted upon shaft 52, the hub of spur gear 82 carrying a notched disk 85, while the hub of spur gear 84 carries a similar notched disk 86. It will be apparent, therefore, that when shaft 75 is turned in one direction, the shaft 52 and the spur gears 83 and 84, and parts carried thereby, will be simultaneously turned in the same direction, the relative turning movement being determined by the proportionate sizes of gears employed. As clearly shown in Figs. 2 and 9, all the drums except 90 are rotatably mounted upon shaft 52 and secured for operation as follows; a clock driven time of day drum 87 secured to spur gear 54, a first rate price drum 88 secured to spur gear 83, a second rate price drum 89 secured to spur gear 84, an elapsed-time drum 90 secured to spur gear 65, and a drum 91 secured to spur gear 67. Drum 90, as shown in Figs. 2 and 3, is secured to rotate with shaft 52 by means of a coiled wire 92 fastened at one end in shaft 52 and at the other end secured in drum 90. It will be apparent, therefore, that when shaft 75 is rotated, thereby rotating shaft 52 through gears 77 and 78, the drum 90, and with it the spur gear 65, will rotate with shaft 52. Gear 65 will thereby rotate the spur gear 64 of the differential which, through the intermediate bevel gears 62 and 63, will rotate the spur gear 66 in the opposite direction. This will simultaneously operate to turn drum 91 in a direction opposite to that in which drums 88, 89 and 90 are being turned, and also, through the bevel gears 68, 69 will operate clock hands 72. The said clock hands, therefore, obviously may indicate upon the dial certain conditions of relative position of the drums 88, 89, 90 and 91, and these positions are fixed by means of operation of the shaft 75. The position of drum 87 is, of course, positively determined by the clock 18, which at the same time, through the differential on shaft 57, drives hands 72 and also drum 91. It will be understood that this will be effected by reason of the fact that bevel gear 59 of differential is held stationary through the train of gearing consisting of spur gear 64, spur gear 65 secured to shaft 52, spur gears 78 and 77, and shaft 75. A friction disk 93, secured to shaft 75 by a hub 95, is engaged by a spring friction member 94 which effectually operates to prevent movement of the above parts except when turned by the operator. It is apparent, therefore, that the two clock faces each disclose clock hands which are normally synchronously driven, and, therefore, correctly indicate present time. The position of the clock hands 72, however, may be readily adjusted at will by means of the shaft 75. The drums 87 and 91, respectively, are constantly driven in opposite directions at equal speeds by the clock 18. Each of these drums has upon the peripheral face thereof a series of numerals from one to sixty, or, rather, from one to fifty-nine, with the space for number sixty indicated as 00. The escapement mechanism above described by which shaft 48 is driven from hand 33 on clock post 19 is such that said shaft is turned one-sixtieth of a complete revolution for each minute of elapsed time. The figures on the time of day drums 87 and 91 correspond to these sixtieth divisions and, therefore, at the end of each minute a new figure is brought into a given plane on each drum 87 and 91, and these figures will always correspond in a given plane when the sets of clock hands indicate the same time on both clock dials. The intermediate price drums 88 and 89 have sets of figures in fives and multiples of fives up to one hundred, which is printed as double 00. It is to be noted that as many intermediate drums similar to 88 and 89 as may be desired can be employed. For the sake of simplicity only two such drums are shown. But it is contemplated by me, and may in some cases be desirable to employ three, four or even more of such drums. The figures on the drums 88 and 89 are to indicate the gross amount due at a given rate, as shown, for example, on the illustrative cards at the rates of forty cents an hour and sixty cents an hour. A secondary series of drums 96, 97, 98, 99 and 100 are loosely mounted on the shaft 52. Drum 96 is in proximity to drum 87 and has thereon figures corresponding to the hours for a. m. and p. m. Drum 100 is in proximity to drum 91 and has figures similar to those on drum 96. Drum 99 is in proximity to drum 90 and is provided with figures corresponding to hours of elapsed time. Drums 97 and 98 are in proximity, respectively, to drums 88 and 89 and have figures thereon indicating integral dollars. All of the figures on the several drums are formed of raised type so that these drums or rollers each of them comprise printing rollers.

Each of drums 96 to 100 has fast thereon a gear 101, which gears mesh with gears 102 on sleeves or hubs 103 rotatably mounted upon a shaft 104 fixedly carried by partitions 58 and 12. Each of the sleeves 103 has thereon a star wheel 105, which star wheel is in the path of pins 106 extending from the insides of the several drums 87, 88, 89, 90 and 91. The star wheels 105 are engaged by a toothed spring pawl 106', by which the star wheels and the various drums geared thereto are held in fixed relative position. It will be apparent from this that for each complete revolution of any of the driven drums 87 to 91 the respective correlated drums 96 to 100 will be moved a distance corresponding to one complete interval.

The purpose of all of this mechanism is to provide means for alining the several sets of figures on the drum so as to effect printing of a card, as indicated in Fig. 11, by a single stroke of a printing device connected with the machine and which will be later described. The setting of the various parts is effected partly by the clock 18 and partly by the shaft 75 manipulated from the hand crank 76. As above pointed out, the time drums 87 and 91, when the two sets of hands indicate the same time, have the same sets of figures in alinement; and at such times, also, the elapsed time drums 90 and 99 will be set to indicate zero, and so too of the money-charge drums. At the time of the beginning of a charge, as when two players begin to use a table, the time-billing card is stamped to indicate the time of starting, as shown in Fig. 10. This is done by the aforesaid printing mechanism and the player may keep a copy of the card. After the termination of play the shaft 75 is rotated so as to turn the hands 72 until they indicate upon dial 73 the starting time printed on the billing card. This will, through the mechanism pointed out, differentially rotate the time drums 91, 100, the elapsed time drums 90 and 99 and the sets of money-charge drums. When the card is then printed, it will show in the several columns a second printing of the starting time, the absolute elapsed time, the amount due or charged for such elapsed time at the several rates per hour and the time at which play was stopped. It is immaterial whether at any time the hands 72 are set to show the same time as the hands 28, 29. All that is necessary in order to get a correct elapsed time record is to set the hands 72 to indicate the starting time. The gap between that and present time will be recorded by the elapsed time rolls, and the charging drums correspondingly indicate the several amounts to be paid at the different rates.

It will thus be seen that time of day drum 87 is directly controlled by the clock from the shaft 48, and the time of day drum 91 is also controlled by the clock through gearing 54, 56, shaft 57, differential and gear 66 connected with differential gear mechanism and meshing with gear 107 on time of day drum 91. The starting time drum 91 may, however, be independently operated by shaft 130

75 by reason of operation of shaft 52 therefrom and the operation of differential from gear 65 on shaft 52 meshing with the gear 64 on differential. The time of day drum 87 therefore bears a fixed relation to the clock. The time of day drum 91 has a fixed relation to the second set of clock hands 72 which may be different from those of the clock proper, 28, 29. In operation, when a player starts in, the card is inserted under the drums 87, 96 stamped in the column labeled, "Started." This stamps the true time corresponding to that shown by clock hands 28, 29. The player takes his card and after playing 1.30 minutes returns to the operator. The operator notes that the card is stamped for starting at 6 p. m. The operator then through crank 76 turns shaft 75. This, through gearing 79, 83 and 80, 84 turns shaft 52 which through gearing 65, 64 operates the differential with the result that the clock hands 72 are rotated and the time of day drums 91, 100 are correspondingly rotated. In this manner the operator sets the clock hand 72 to indicate the starting time 6 p. m. Thus the operator has, through rotation of the shaft 75, set the price drums 88 and 89 (with their coördinate price drums 97 and 98) to indicate the amount to be paid at the rate for lapsed time and at the same time has set the lapsed time drums so that the actual time lapsed goes into the printing line. The card is then inserted in its proper place and the lever 128 operated. Time drums 91, 100 again print the starting time and time of day drums 87, 96 print the true time of day when the operation is terminated. The lapsed time drums 90, 99 print the actual lapsed time and the price drums 88, 97 and 89, 98 print the price of service. It is to be noted that the turning of shaft 75 sets back the time of day drum 91 and the clock hands 72 and at the same time advances lapsed time drums and the price drums an amount proportional to the amount the clock hands are turned back.

The printing is effected in the following manner. As shown in Fig. 9, an ink ribbon 107 extends from rollers on shafts 108 and 109 through holders 110 extended horizontally from plate 13. The shafts 108 and 109 have thereon heads 111, by which the same may be turned by hand to move the ink ribbon after it is printed. Beneath the ribbon 107, and in the vertical plane of shaft 52, is a printing hammer 112, preferably having a rubber facing 113. As best shown in Fig. 3, the hammer 112 is carried by a pair of arms 114, 115 which are pivotally secured to a shaft 116 journaled in side members 11 and 12. The shaft 116 has fast thereon an arm 117 which is normally pulled upwardly into its most elevated position by a spring 118 connected with a pin 119 on arm 117 and another pin 120 extended from frame-piece 12. The arm 117 has pivoted thereon a dog 121 adapted to engage over a lug 122 on the side of arm 114 to connect said arm 114 with the hammer 112 for movement from arm 117. The dog 121 is held in its upward position by means of a spring 132 connected with a rearwardly-disposed arm 123. A nose 124 extending forwardly from dog 121 is positioned to engage an adjustable trip 125 when the arm 117 is carried down sufficiently far. Engagement of nose 124 with trip 125 rocks the dog 121 so as to withdraw the same from engagement with the lug 122. A powerful spring member 126, herein shown as a leaf spring, engages the lower side of hammer 112 and is forced downward by said hammer when arm 117 is rocked. When the hammer and its carriers are released, the spring 126 throws the hammer forcibly upward against the ribbon holders 110 and ink ribbon 107. The holders being of spring material pass upward between the various printing drums, and the hammer compresses the ribbon between said drums and the card 127 which is to be printed. The shaft 116 is operated by a lever 128 having thereon a handle or pusher-plate 129.

Through the operation of the escapement drive from clock 18 by means of spur gear 51, the time printing drums will always be set so as to print the minute at which the machine is operated. The money-charge drums, however, and the elapsed-time drum may not be positioned exactly for printing particularly because the money-charge drums only print fives or multiples thereof. For this reason, as above pointed out, each of these drums is connected to the means for rotating the same by a yielding device, drums 88 and 89 being connected by the springs 81 and 82 to shaft 75, while drum 90 is connected by means of spring wire 92 to shaft 52. It is necessary, therefore, to provide means for justifying these drums when printing is effected. To accomplish this I provide an arm 130 on shaft 116. This arm is connected by a link 131 and a spring 133 with a rod 134 connecting a series of levers 135 pivoted to a shaft 136, as clearly shown in Figs. 3 and 4. Each of levers 135 is provided with a wedge-shaped detent 137 adapted to enter the notches 138 in the justifying disks 85. When the shaft 116 is actuated by shaft 128 the arm 130 will rock the levers 135 and bring the wedge-shaped portions 137 into the notches 138 before the dog 121 has been tripped. This will correctly position each of the printing drums 88, 89 and 90. The spring 132 will permit the continued movement of the parts connected with shaft 116 until detent 121 is tripped and the printing hammer 112 operates to effect printing.

Referring particularly to Figs. 2 and 9, it will be seen that the shaft 52 has mounted upon it ten drums as follows: The time-of-day drum 87 and its associated drum 96 indicating minutes and hours respectively; the time-of-day drum 91 and its associated drum 100 indicating minutes and hours respectively; a price drum 88 and its associated drum 97 indicating cents and dollars respectively; a second price drum 89 and its associated drum 98 indicating cents and dollars respectively; an elapsed-time drum 90 and its associated drum 99 indicating minutes and hours respectively. All of these drums with the exception of the drum 90 are loosely mounted on the shaft 52. The drum 90 is yieldingly attached to said shaft by the spring 92 as previously stated, and this drum is secured to the spur gear 65 in mesh with the spur gear 64 which is loosely mounted on the shaft 57. The spur gear 64 and its attached bevel gear 59, and hence the drum 90, also are normally held stationary by means of the spur gear 65 secured to the shaft 62, spur gears 77 and 78 and the shaft 75, the latter being held by the friction disk 93. It is obvious that when the shaft 75 is rotated by hand the shaft 52 and the drum 90 will be rotated and the gear 65 will rotate the spur gear 64, which through the bevel gears 62 and 63 will rotate the spur gear 66 in the opposite direction. The drum 87 is clock-driven by means of the spur gear 54 which is secured to the shaft 48 rotated by the clock mechanism as previously described. The drum 91 is clock driven by means of the spur gear 67 secured thereto and which is in mesh with the spur gear 66 driven through the differential and the spur gear 56 which is in mesh with the spur gear 54. The drum 91 may also be set by hand through the shaft 75, the spur gear 77 in mesh with the spur gear 78 secured to the shaft 52 and the spur gear 65 secured to the latter shaft and in mesh with the spur gear 64 operating through the differential and a spur gear 66 which is in mesh with the spur gear 67 secured to said drum. The drum 88 is hand operated through the spur gear 83 secured thereto and in mesh with the spur gear 79 attached to the shaft 75. The drum 89 is hand operated through the spur gear 84 secured thereto and in mesh with the spur gear 80 attached to the shaft 75. The secondary drums 96, 97, 98, 99 and 100 are operated through the associated drums 87, 88, 89, 90 and 91 in the manner previously described.

The operation of my time-billing machine has been given quite fully in connection with the detailed description thereof. It is important to note that in the final stamping of the card the starting time is again printed on the card. This provides an accurate check on the setting of the printing drums, since if the drums are not set correctly the starting time will appear with two different figures, which would immediately indicate the error. It is to be noted that the entire apparatus is controlled by a single clock, which alone will need to be adjusted and regulated for time keeping purposes. The escapement from this clock and differential drive of the second clock hands, and also of time drums and elapsed-time rollers may be employed entirely apart from the money-charge drums, if desired, and would provide a useful device for keeping time of employees, cost system, etc.

When a player starts, the card is placed with its left hand portion under the drum or type wheels 87 and 96 and is stamped in the column labeled "Started." When the player has finished, the card is placed with the left hand portion under the drums or type wheels 91 and 100 in such position that these drums will print directly underneath the starting time previously printed by the drums 87 and 96. Before the second printing operation is performed the shaft 75 is rotated so as to turn the hands 72 until they indicate upon the dial 73 the starting time printed on the card. When this is done the gear 65 rotates the gear 64 and through the bevel gears 62 and 63, the gear 66 and the mesh gear 67 are rotated, thereby moving the drum 91 and the associated drum 100 back to the original position so that they will print the starting time directly underneath the starting time previously printed by the drums 87 and 96.

I claim:—

1. An elapsed-time recorder comprising a clock, clock hands, means controlled by the clock for driving said clock hands including a differential, a pair of spur gears movable with corresponding members of the differential, a manually-driven shaft, a countershaft, an elapsed-time drum movable with the said counter-shaft, and a gear fast on said elapsed-time drum meshing with one of said differential spur gears, whereby rotation of the shaft will operate the elapsed-time drum and the clock hands independently of said clock-controlled means.

2. An elapsed-time recorder comprising a clock, clock hands, means controlled by the clock for driving said clock hands including a differential, a pair of spur gears movable with corresponding members of the differential, a manually-driven shaft, a counter-shaft, an elapsed-time drum movable with the said counter-shaft, a gear fast on said elapsed-time drum meshing with one of said differential spur gears, a time-drum loose on said counter-shaft, and a gear movable with said time-drum meshing with the other differential spur gear, whereby rotation of the shaft will drive the elapsed-time rollers and the clock hands independently of the clock-controlled means, and through said differential will drive the time-drum in the opposite direction to the elapsed-time drum.

3. An elapsed-time recorder comprising a clock, clock hands, means controlled by the clock for driving said clock hands including a differential, a pair of spur gears movable with corresponding members of the differential, a manually-driven shaft, a counter-shaft geared thereto, an elapsed-time drum movable with said counter-shaft and geared to one of said differential spur gears, a time-drum and one or more sets of cost-drums loose on said counter-shaft, said last named time-drum being geared to the other differential spur gear, said cost-drums being geared to the manually-driven shaft, the ratio of gearing of the cost-drums being proportioned to that of the connections for driving the hands from the shaft so that a movement of the hands indicating time periods will be followed by a proportional movement of the respective sets of cost-drums.

4. An elapsed time recorder comprising a clock, a normally stationary elapsed time drum, means for manually operating said elapsed time-drum, a time of day indicating device, means for driving said indicating device from said clock including a differential, and means connecting said indicating device and said elapsed time-drum through said differential so that movement of said elapsed time drum by said manual means will correspondingly move said indicating device independently of said clock.

In testimony whereof I affix my signature in presence of two witnesses.

LAWRENCE G. ZESBAUGH.

Witnesses:
ROBERT W. MUIR,
H. A. BOWMAN.